United States Patent
Thorn et al.

(10) Patent No.: US 9,973,614 B2
(45) Date of Patent: May 15, 2018

(54) SYSTEM AND METHOD FOR CONTROLLING AN ELECTRONIC DEVICE BY HUMAN TREMOR DETECTION

(71) Applicant: Sony Mobile Communications AB, Lund (SE)

(72) Inventors: Ola Thorn, Lund (SE); Magnus Midholt, Lund (SE); Olivier Moliner, Lund (SE); Alexandar Rodzevski, Lund (SE); Erik Westenius, Lund (SE)

(73) Assignee: SONY MOBILE COMMUNICATIONS, INC., Tokyo (JP)

( * ) Notice: Subject to any disclaimer, the term of this patent is extended or adjusted under 35 U.S.C. 154(b) by 0 days. days.

(21) Appl. No.: 15/115,699

(22) PCT Filed: Apr. 1, 2014

(86) PCT No.: PCT/IB2014/060363
§ 371 (c)(1),
(2) Date: Aug. 1, 2016

(87) PCT Pub. No.: WO2015/150869
PCT Pub. Date: Oct. 8, 2015

(65) Prior Publication Data
US 2017/0149956 A1 May 25, 2017

(51) Int. Cl.
*H04M 1/00* (2006.01)
*H04M 1/725* (2006.01)
*G06F 3/01* (2006.01)

(52) U.S. Cl.
CPC ........ *H04M 1/72569* (2013.01); *G06F 3/015* (2013.01); *H04M 2250/12* (2013.01)

(58) Field of Classification Search
CPC ................ H04M 1/72569; G06F 3/015
(Continued)

(56) References Cited

U.S. PATENT DOCUMENTS

| | | | | |
|---|---|---|---|---|
| 8,614,431 B2 * | 12/2013 | Huppi | ............... | H04M 1/72563 250/559.36 |
| 2005/0243061 A1 * | 11/2005 | Liberty | ................ | A61B 5/1171 345/158 |

(Continued)

FOREIGN PATENT DOCUMENTS

| WO | 2013/144670 | 10/2013 | | |
|---|---|---|---|---|
| WO | WO 2013144670 A1 * | 10/2013 | .............. | G06F 3/011 |

OTHER PUBLICATIONS

International Search Report and Written Opinion for corresponding Internaitonal application No. PCT/IB2014/060363 dated Dec. 5, 2014.

*Primary Examiner* — Md Talukder
(74) *Attorney, Agent, or Firm* — Renner, Otto, Boisselle & Sklar, LLP

(57) ABSTRACT

An electronic device is operated based on whether it detects vibration indicative of natural human tremors while the device is not enclosed in a small space. Human tremors are detected by sampling a motion signal and performing a discrete Fourier transformation on a plurality of sets of samples. For each sample, a mean magnitude is calculated for a first range of frequencies indicative of human tremors. A mean magnitude is also calculated for a second range of frequencies greater than the first range. If the difference between the mean magnitude of the first range and the mean magnitude of the second range, then human tremors are detected for the set of samples. Human tremors are detected for the device if a threshold number of sets of samples within a predetermined time period produce an output indicating detection.

18 Claims, 3 Drawing Sheets

(58) Field of Classification Search
USPC .......................... 455/550.1, 41.1, 41.2, 41.3
See application file for complete search history.

(56) References Cited

U.S. PATENT DOCUMENTS

| | | | |
|---|---|---|---|
| 2007/0099574 A1* | 5/2007 | Wang | H04M 1/72569 |
| | | | 455/67.11 |
| 2010/0311406 A1* | 12/2010 | Lin | H04M 11/007 |
| | | | 455/420 |
| 2011/0294470 A1* | 12/2011 | Pasquero | H04B 1/3888 |
| | | | 455/412.2 |
| 2013/0133423 A1 | 5/2013 | Kim et al. | |
| 2015/0164377 A1* | 6/2015 | Nathan | A61B 5/1122 |
| | | | 600/595 |
| 2016/0030804 A1* | 2/2016 | Mizuochi | A61B 5/11 |
| | | | 482/8 |
| 2016/0320915 A1* | 11/2016 | Williamson | G06F 3/0416 |
| 2017/0149956 A1* | 5/2017 | Thorn | H04M 1/72569 |

\* cited by examiner

SYSTEM AND METHOD FOR CONTROLLING AN ELECTRONIC DEVICE BY HUMAN TREMOR DETECTION

TECHNICAL FIELD OF THE INVENTION

The present technology relates generally to human tremor detection, and more particularly to controlling an electronic device based on detecting natural tremors of the human body.

BACKGROUND

Electronic devices today are ubiquitous, and portable device are often carried with people everywhere they go. While these devices have changed the way people interact and conduct business, they can easily become a nuisance. For example, a user of a mobile phone may intentionally, or unintentionally, leave the ringer of the phone on. This may lead to the phone ringing loudly at an awkward or unwanted time. Some phones allow a user to silence or stop a ringtone by pressing a button on the phone, but the button may not be easily or quickly accessible.

It has long been known that the natural processes of the human body create a perpetual low-frequency vibration. Sensing of human vibrations, or tremors, has been used, for example, in surgical instruments to mitigate the effect of hands shaking. And while human tremor detection has been proposed for use with cellular phones, prior techniques do not provide an overly accurate detection method. For example, a phone intending to detect tremors while being held in a human hand would return a false positive every time the phone was placed in a pants pocket, near a leg that emits the same natural tremors.

SUMMARY

Disclosed is a system and method for controlling an electronic device based on detecting natural human tremors. The device is controlled based on whether it detects human tremors while it is not physically enclosed in a small space. Human tremors are detected from a vibration signal by comparing the mean magnitude of a first range of frequencies indicative of human tremors to the mean magnitude of a second range of frequencies higher than the first range of frequencies.

According to an aspect of the disclosure, a method for controlling an electronic device includes detecting whether the electronic device is physically enclosed in a small space, detecting whether the electronic device is vibrating at a rate indicative of natural tremors of a human body, and operating the electronic device in response to whether the electronic device is vibrating at a rate indicative of natural tremors of a human body while the electronic device is not physically enclosed in a small space.

According to an embodiment of the method, the detecting whether the electronic device is vibrating at a rate indicative of natural tremors of a human body includes receiving an electronic signal indicative of movement of the electronic device, performing a discrete Fourier transformation on each of a plurality of sets of samples of the signal, for each transformed set of samples determining a mean value of a magnitude of the set of samples for a first range of frequencies indicative of natural tremors of a human body, determining a mean value of a magnitude of the set of samples for a second range of frequencies higher than the first range, and producing an output indicating detection if the difference between the mean value of the magnitude of the first range of frequencies and the mean value of the magnitude of second range of frequencies is greater than a threshold value, and producing an output indicating that the electronic device is vibrating at a rate indicative of natural tremors of a human body if a threshold number of sets of samples within a predetermined time period produce an output indicating detection.

According to a further embodiment of the method, the method further includes linearly detrending the signal.

According to another embodiment of the method, the detecting whether the electronic device is physically enclosed in a small space includes detecting a sufficient amount of infrared light emitted from the electronic device.

According to yet another embodiment of the method, the operating the electronic device includes controlling a ringer of the electronic device.

According to one more embodiment of the method, the operating the electronic device includes changing which of a plurality of speakers of the electronic device are used for sound output.

According to another embodiment of the method, the operating of the electronic device includes controlling the volume of an application of the electronic device.

According to a further embodiment of the method, the operating of the electronic device includes transmitting a signal over a network to effect control of a second electronic device.

According to yet another embodiment of the method, the electronic device is a mobile phone.

According to another aspect of the disclosure, an electronic device includes an accelerometer, a proximity sensor, and circuitry adapted to operate the electronic device in response to whether the accelerometer detects vibration at a rate indicative of natural tremors of a human body while the proximity detector does not detect that the electronic device is physically enclosed in a small space.

According to an embodiment of the electronic device, the circuitry is further adapted to receive an electronic signal from the accelerometer, perform a discrete Fourier transformation on each of a plurality of sets of samples of the signal, for each transformed set of samples determine a mean value of a magnitude of the set of samples for a first range of frequencies indicative of natural tremors of a human body, determine a mean value of a magnitude of the set of samples for a second range of frequencies higher than the first range, and produce an output indicating detection if the difference between the mean value of the magnitude of the first range of frequencies and the mean value of the magnitude of second range of frequencies is greater than a threshold value, and produce an output indicating that the electronic device is vibrating at a rate indicative of natural tremors of a human body if a threshold number of sets of samples within a predetermined time period produce an output indicating detection.

According to a further embodiment of the electronic device, the signal is linearly detrended.

According to another embodiment of the electronic device, the proximity sensor is an infrared proximity sensor.

According to yet an embodiment of the electronic device, the device further includes a ringer, and the operating of the electronic device includes controlling the ringer.

According to one more embodiment of the electronic device, the device further includes a plurality of speakers, and the operating of the electronic device includes changing which of the speakers are used for sound output.

According to another embodiment of the electronic device, the operating of the electronic device includes controlling the volume of an application of the electronic device.

According to a further embodiment of the electronic device, the operating of the electronic device includes transmitting a signal over a network to effect control of a second electronic device connect.

According to yet another embodiment of the electronic device, the device is a mobile phone.

According to another aspect of the disclosure, a method for controlling an electronic device includes receiving an electronic signal indicative of movement of the electronic device, performing a discrete Fourier transformation on each of a plurality of sets of samples of the signal, for each transformed set of samples determining a mean value of a magnitude of the signal for a first range of frequencies indicative of natural tremors of a human body, determining a mean value of a magnitude of the signal for a second range of frequencies higher than the first range, and producing an output indicating detection if the difference between the mean value of the magnitude of the first range of frequencies and the mean value of the magnitude of second range of frequencies is greater than a threshold value, and operating the electronic device in response to whether a threshold number of sets of samples within a predetermined time period produce an output indicating detection.

According to an embodiment of the method, the method further includes linearly detrending the signal.

DETAILED DESCRIPTION OF EMBODIMENTS

Figure 1:
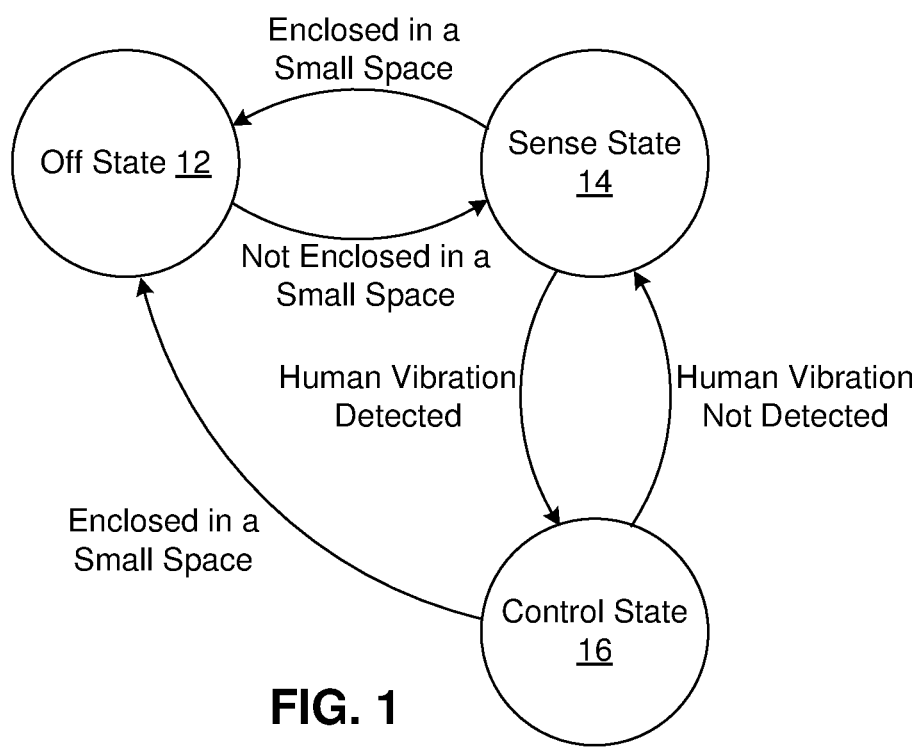
FIG. 1 is an exemplary state diagram for controlling an electronic device based on proximity and human tremor detection.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments. Further, although method descriptions and flow charts may show specific orders of executing steps, the order of executing the steps may be changed relative to the order described. Also, two or more steps described in succession may be executed concurrently or with partial concurrence. One or more of the described or illustrated steps may be omitted.

Described below in conjunction with the appended figures are various embodiments of an electronic device and method of operating the electronic device. The electronic device is typically—but not necessarily—a portable electronic device, and may take any form factor including, but not limited to, a mobile telephone, a tablet computing device, a laptop computer, a gaming device, a camera, or a media player. The electronic device shown in the appended figures is a mobile telephone, but applicability of aspects of the invention is not limited to mobile telephones.

The present disclosure describes a system and method for detecting vibration of an electronic device that is indicative of natural human tremors. Typically, when an electronic device is grasped by a user's hand or placed in contact with a human body, kinetic energy from the natural tremors of the human body will transfer to the electronic device, causing the device to vibrate at similar frequencies. By detecting vibrations at those frequencies, it is possible to effect control of the electronic device.

Turning first to FIG. 1, illustrated is a state diagram exemplifying a method for controlling an electronic device based on proximity and human tremor detection. The method may begin in off state 12. In off state 12, the electronic device detects whether the electronic device is physically enclosed in a small space. If the electronic device is not physically enclosed in a small space, the method progresses to sense state 14. One benefit of detecting whether the electronic device is physically enclosed in a small space is to prevent measuring tremors while the device is in a pocket of the user's clothes (e.g., a pants pocket). Otherwise, the electronic device may detect tremors from an adjacent leg or other body part and perform an unwanted action based on that detection.

One exemplary technique for measuring proximity is by use of one or more infrared proximity sensors. An infrared proximity sensor measures the proximity of objects to the sensor by emitting infrared light and detecting the amount of infrared light reflected back to the sensor. Thus, an infrared sensor would detect that the electronic device is physically enclosed in a small space if the infrared sensor detected a sufficient amount of infrared light to indicate a small space. That sufficient amount of infrared light should be high enough to indicate detection of small space when the electronic device is in, for example, a pocket, but low enough to proceed to sense state 14 if the device is in any larger space, such as a purse, or a dark room. For instance, a sufficient value would not allow the device to proceed from off state 12 if the device were enclosed in a location where the distance to an adjacent item reflecting the infrared light is less than 2 to 3 cm, but would allow the device to proceed from off state 12 in any larger space.

It is possible to use more than one proximity sensor to detect whether the device is in an enclosed space. Using additional sensors lessens the probably that the device will falsely detect an enclosed space, for example, if the device were grasped by a hand in a way that covered a lone proximity sensor. If more than one sensor is used, the method may require a threshold detection from all of the sensors. Alternatively, the method may require detection from at least two or more sensors.

In sense state 14, the electronic device continues to detect whether the electronic device is physically enclosed in a small space and, if the electronic device is physically enclosed in a small space, the method will return to off state 12. While in sense state 14, the device also detects for vibrations at a rate indicative of natural human tremors. If the electronic device detects human tremors, the method moves to control state 16. An exemplary method for detecting human tremors is later described in detail.

At control state 16, the device continues to detect proximity as well as human tremors. If the electronic device detects that it is physically enclosed in a small space, the method will return to off state 12. If, at control state 16, the electronic still detects that it is not physically enclosed in a small space but no longer detects human tremors, the method will return to sense state 14. Whether the device is in control state 16 (i.e. whether the device concurrently detects human tremors while not detecting that it is physically enclosed in a small space) may control how the device operates.

It should be appreciated that there are any number of applications in which tremor detection can effect control of the electronic device. For instance, detection of human tremors could be used to control the ringer of an incoming call. In one example, tremor detection could be used to silence a ringing phone. In this example, a phone, whether in a pocket, in a purse, or on table may be ringing from an incoming call. The ring could be silenced once the phone detects human tremors while not enclosed in a small space. Thus, a phone in a purse or on a table would be silenced once grasped by a user's hand. A phone in a pocket would be silenced once grasped by a user's hand and removed from the pocket. In either case, no buttons need be pressed to silence the phone. Similarly, the same function could be used to stop or change the intensity of a vibrator of a mobile phone. In this way, a phone that is noisily vibrating on a table, for example, may be picked up and held in hand to turn off or lower the intensity of the vibration.

Tremor detection can also be used to terminate a phone call on the electronic device when a user releases the device. If the user of the device is grasping the device in his or her hand during the call, then tremors should be detected and the device will take no action in response. If the user places the phone down or releases the device from his or her hand, then tremors would no longer be detected and the device may terminate the phone call in response.

Tremor detection can further be used in any number of applications to mute or control sound volume. For example, a mute function of an electronic device could be deactivated when human tremors are detected and activated when tremors are not detected. Thus, a device could be switched into a muted state when released from a hand (e.g., placed on a table). The volume could be restored when the electronic device was picked up and tremors were again detected. On an electronic device with a timer function, tremor detection could be used to silence an audible indication that the timer has expired, and/or to stop the timer. On an electronic device with an alarm function, tremor detection could be used to silence an alarm, activate a "snooze" feature, and/or reset the alarm.

In a another exemplary application of tremor detection, the detection could be used to switch to a mobile phone to a speaker mode, where the audio output from a call is emitted from a loudspeaker of the phone, instead of a smaller speaker intended to be placed next to a user's ear. In this application, if no tremors are detected, it can be assumed that the user is not holding the phone to his or her ear, and instead has placed the phone down in some location (e.g., on a table). Thus, if tremors are not detected while the user is actively on call, the device may active the speaker function. Conversely, once tremors are detected, the device may assume it has been picked up by the user and deactivate the speaker feature. Alternatively, releasing the device (i.e. tremors no longer detected) may cause the device to activate a wired or wireless headset, such as a Bluetooth headset, and transmit audio to the wireless headset in lieu of activating a speaker function.

Tremor detection can also be used to turn on or off a microphone on an electronic device. For example, when the electronic device is picked up by a user and tremors are detected, the device may turn the microphone on. When the device is placed down and no longer held by the user, the microphone may turn off.

In yet another exemplary application of tremor detection, detection on the electronic device could be used to remotely control a second electronic device that is connected by network to the first electronic device. For example, the electronic device may be networked to a television or to speakers, or to a receiver controlling a set of speakers. Tremor detection on the first electronic device could send a signal via a network to the television or speakers to mute or lower the sound on the television or speakers. Similarly, when tremors are no longer detected, the electronic device may send a signal to turn on or raise the volume of the television or speakers.

In a further exemplary application of tremor detection, detection could be used as a hold-on feature for the electronic device. In this example, so long as the device is detecting human tremors while not enclosed in a small space, any sleep or dimming feature affecting the display of the device would be disabled. Accordingly, if a user is holding the device in hand while reading text, looking at images, or watching a video, the display will not sleep or dim. If the user sets the device down, releases it into a purse, or places it in a pocket, the sleep and/or dim functions will be reactivated.

Similarly, tremor detection could be used to wake an electronic device from a sleep or dimmed state. If an electronic device is set down on a table or in a purse, picking up and holding the phone by hand could wake the phone from its sleep or dimmed state without having to press any additional buttons or provide any further input. A phone in a pocket would automatically wake once it is both grasped by a user's hand and pulled from the pocket.

The method could be used as part of an application programming interface ("API"). An API would allow other software on an electronic device to access the vibration detection feature and use it for any number of purposes. For example, human vibration detection could be a feature of an interactive game or as input to an interactive social media application.

According to the exemplary state diagram of FIG. 1, the electronic device will always sense for proximity and, if the device is not physically enclosed in a small space, will sense for tremors. It is possible, however, that other events may trigger the start of the detection process at any state. For example, if the method is used only to activate a speaker function, as described above, all detection may remain off until a call is initiated or received on the device. Then, the method may begin in the off state 12 as explained above, or may skip proximity sensing altogether and begin detecting for tremors. Likewise, if the method is implemented only in an API, detection may remain off until triggered or called by an application event. Then, the method may begin in the off state 12 as explained above, or may skip proximity sensing altogether and begin detecting for tremors. If the method were used only as wake feature, the detection could be turned off while the electronic device were in use and begin detection in off state 12 once the device were placed in a sleep state.

Figure 2:
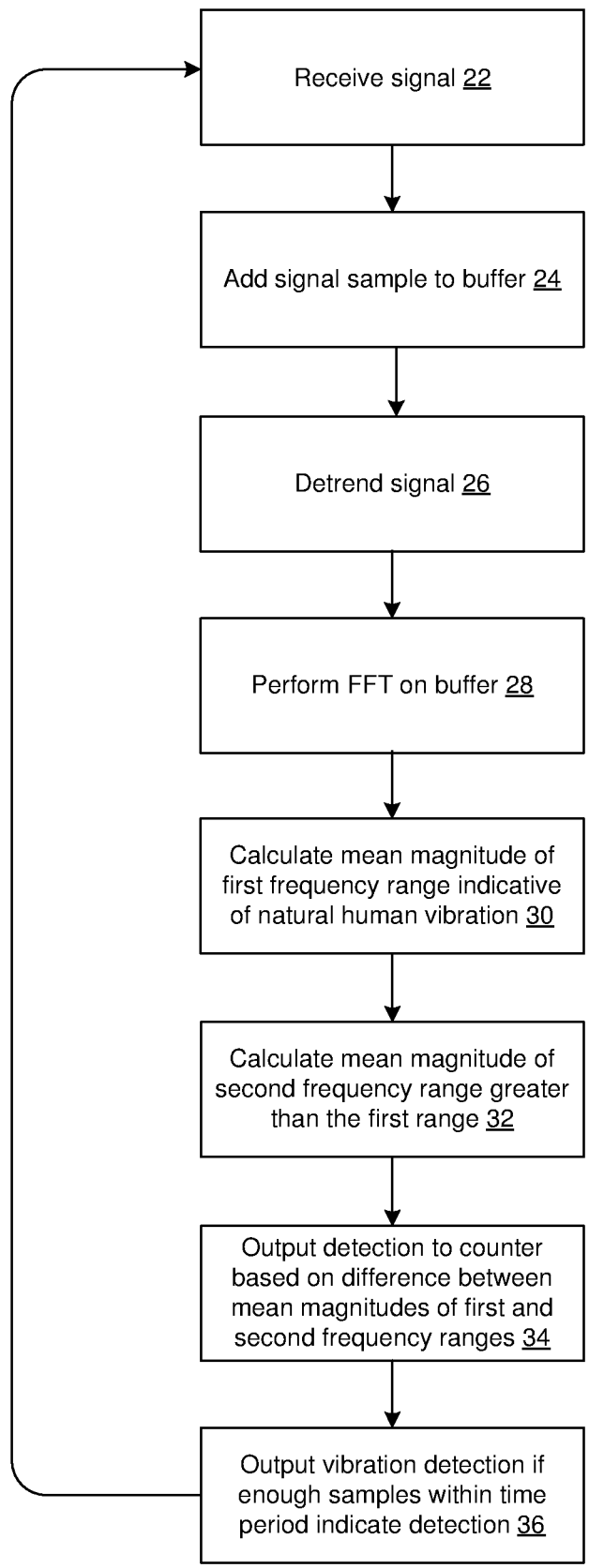
FIG. 2 is a flow diagram representing exemplary steps for detecting human tremors.

Referring now to FIG. 2, a flow diagram shows an exemplary method for detecting when vibration of an electronic device is indicative of natural human tremors. At step 22, an electronic signal indicative of movement of the electronic device is received. The signal may be an output of motions sensors of the electronic device, such as one or more accelerometers. The signal may be in analog or digital form, depending on the output of the motion sensor, and may be transformed from analog to digital, or vice versa, after output from the motion-sensing device. For example, an analog output may constitute a sine wave representing amplitude over time, with the period of the wave representing frequency. A digital output may be in the form of a pulse wave, where the length of the pulse represents frequency.

At step 24, the signal is sampled. The signal may be sampled at any suitable rate, with the understanding that only frequencies less than or equal to half the sample rate can be accurately detected. For example, if the signal were sampled at 200 Hz, the maximum accurately detectable frequency would be 100 Hz. The samples may be stored in a buffer of the electronic device. The buffer may be treated as a queue, so that when new samples are to be added to the queue, the existing samples are shifted toward the end of the queue, dropping the oldest samples and making room for the newest samples (e.g., a first-in, first-out, or FIFO buffer). For instance, the buffer could be designed to hold 128 samples at 200 Hz. By way of example, if n samples are taken at each of times $t_0$ to $t_n$, and stored in the 128-sample queue, the queue will be full when the sample at $t_{127}$ is added to the queue. When the sample at $t_{128}$ is added to queue, the first sample at $t_0$ will be removed from the queue, and so on.

At step 26, the signal may be linearly detrended. A linear detrend can remove, or subtract, an aperiodic component from the signal and may increase the accuracy of later frequency calculations. The detrend may simply subtract the mean value of the signal from the original signal. Alternatively, the deterend my remove a predefined linear vector from the signal or may calculate a linear vector for removal, for example by least squares regression.

At step 28, a discrete-Fourier transform is derived for each of a plurality of sets of samples of the signal. By way of example, the discrete-Fourier transformation may be a derived by use of a fast-Fourier Transform (FFT) algorithm. The set of samples on which an FFT is performed may be of any suitable size and the rate at which the FFT is performed be any suitable rate. Returning to the previous example with a 128-sample queue, a first FFT may be performed on the entire 128-sample buffer when it is full, at $t_{127}$. A next FFT may be taken at a next time interval, for example after 16 new samples have entered the queue at $t_{143}$. The method may repeat this way, performing an FFT on the entire 128-sample buffer after every 16 samples. As a result, each FFT will be performed on a set of samples wherein 16 of the 128 samples are new compared to the previous FFT.

At step 30, for each transformed sample of step 28, the mean value of a magnitude of the signal for a first range of frequencies indicative of human tremors is determined. The exact range of natural vibration frequencies emitted by human tremors may very depending on many factors, including each person's own genetic makeup, a person's current stress or activity level, or even what foods or drinks a person has recently consumed. Generally, a person's natural tremor frequencies range from between 4 Hz and 18 Hz. The method may thus default to a range between 4 Hz and 18 Hz as being indicative of natural human tremors. The range may be adjustable automatically by the electronic device according to tremors previously sensed for a particular user, or may be adjusted manually by a user to find an optimal frequency range for that user.

At step 32, for each transformed sample analyzed at step 30, a second mean value is calculated for a magnitude of the signal in a second range of frequencies higher than the first range of step 30. Ideally, the second range would include all frequencies above the maximum frequency indicative of human tremors. The ceiling of the range may be the maximum accurately detectable frequency for the sample rate. For example, if the sample rate was 200 Hz and the maximum frequency indicative of human tremors was 18 Hz, then the second range could be 19 Hz to 100 Hz.

At step 34, an output is produced indicating detection if the difference between the mean value of the magnitude of the first range of frequencies and the mean value of the magnitude of second range of frequencies is greater than a threshold value. At this step, the method determines whether, and to what extent, the magnitude of the frequencies indicative of human tremors are greater than other vibration frequencies incident on the electronic device. A higher threshold value, for example greater than 1, will result in a calculation less sensitive to non-human vibration, as the output will only indicate detection if the difference between the magnitude of frequencies in the human-tremor range is much larger than the magnitude of frequencies greater than the human-tremor range. A higher threshold, however, may also result in unwanted failed detections when human-tremor frequencies are only slightly greater in magnitude than other vibration frequencies. Conversely, a lower threshold, for example less than 1, will result in a more sensitive calculation, and can produce an output signal indicating detection when the magnitude of human-tremor frequencies is barely greater than, or even less than, the magnitude of other, greater frequencies. While a lower threshold may lead to more detections, it may also lead to more false positives. The threshold value should picked so as to balance sensitivity and accuracy. A threshold value of 1, for example, should sufficiently balance these interests.

The output of step 34 may be considered as a "sample set detection," detecting whether each sample set indicates human tremors. It should not be confused with output of step 36, which indicates whether the electronic device is vibrating at a rate indicative of human tremors based on a series of sample set detections. Thus, the method may include storing and counting a series of sample set detections to produce a final output based on several sample set detections.

There are many different methods of storing and counting sample set detections. For instance, a final output indicating detection of human tremors may be triggered by a threshold number of positive sample set detections during a preset rime period. The threshold should be high enough, and time period long enough, to prevent false detections from anomalous short-duration vibrations matching the frequency of human tremors. Conversely, the threshold should be low enough, and the time period short enough, so that the device acts quickly in response to actual human-tremor detection. For example, in the 128-sample buffer with 200 Hz samples described earlier, where the buffer is refreshed by 16 samples each cycle, the buffer will be completely refreshed after 8 cycles. In this example, 2 additional cycles could be added to increase detection accuracy, for a total time period of 10 cycles of 16 samples. At 200 Hz, the total time period for detection would then be 0.8 seconds.

In one exemplary technique for storing and counting sample detections, each sample detection output from step 34 may be stored as a buffer of indicators, each indicating positive or negative detection for a set of samples. The indicators may be stored in any form such as binary bits, integers, and so forth. The buffer should be large enough to hold as many indicators as would be created during the predetermined time period during which a threshold number of detections would trigger an output that human tremors are sensed. The buffer may be treated as a queue, so that when a new indicator is to be added to the queue, the existing indicators are shifted toward the end of the queue, dropping the oldest indicator, and making room for the newest indicator.

For example, if the method is configured so that 10 detections out of 15 sets of samples will trigger an output that tremors are sensed, then the sample counter could be a 15-bit queue. For each analyzed set of samples, a new bit indicating detection (e.g. 1 for detection, 0 for no detection) is added to the queue. The method may then parse the queue to see if it contains 10 or more bits representing detection and, if so, output that the electronic device has sensed human tremors.

In another exemplary technique for storing and counting sample detections, a certain number of consecutive sample detections may trigger an output that the electronic device has sensed human tremors. In this case, the number of consecutive detections may be represented by a simple integer that counts up with each sample that results in a detection and resets to zero whenever a sample does not result in a detection. If the count reaches or exceeds the threshold number of sample detections that will trigger an output that the electronic device has sensed human tremors, then the method may proceed to step 36.

It may be desirable to increase the detection time period when the method is used to silence a ringer of mobile phone. Most mobile phones also vibrate as they ring because of the generation of audio output and/or intentional shaking with a vibrator. A phone's vibration while ringing typically alternates on and off in some predetermined pattern, and may interfere with detection of human tremors caused by holding the phone. By increasing the detection time period to account for the periods of vibration caused by ringing, the method can still detect human tremors when the phone's ring-vibration is between periods of vibration.

At step 36, an output is produced indicating that the electronic device is vibrating at a rate indicative of natural human tremors if a threshold number of samples within a predetermined time period produce an output indicating detection. As described earlier, the output will indicate whether the electronic device has detected tremors based on the most recent series of sample detections. If human tremors are not detected, the method may produce an output indicating no detection or may produce no output at all. The above described method may repeat so long as an electronic signal indicative of movement of the electronic device is received.

Figure 3:
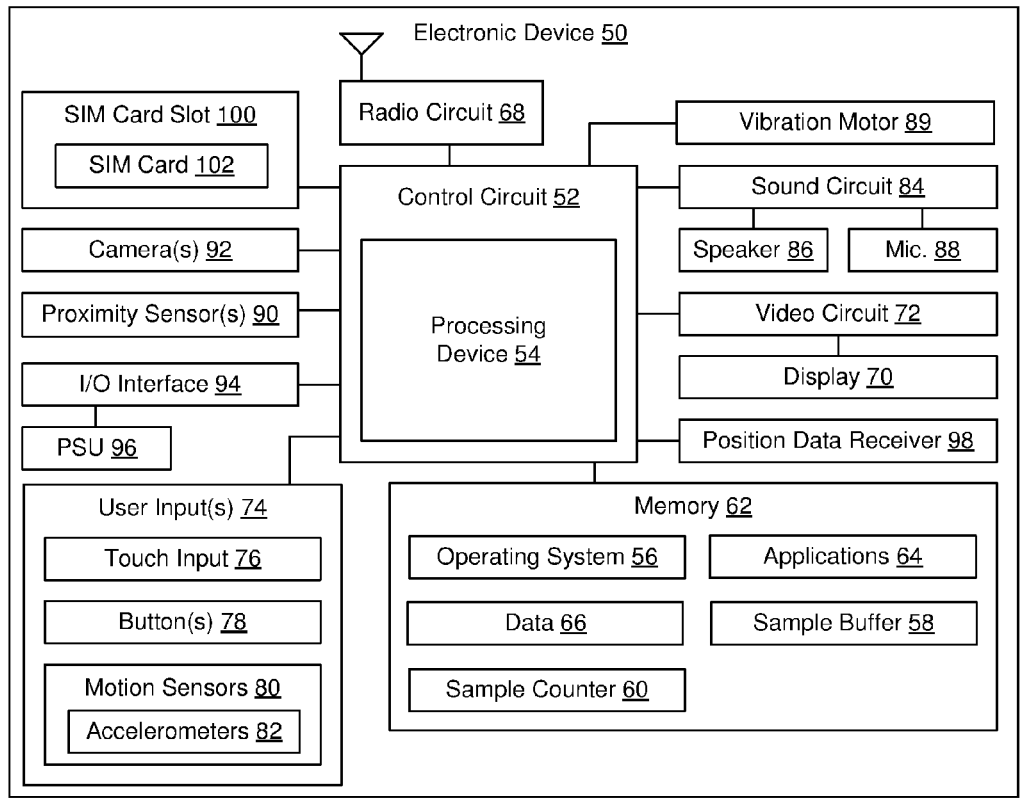
FIG. 3 is a block diagram of an exemplary electronic device.

With additional reference to FIG. 3, a schematic block diagram of the electronic device 50 in an exemplary form as a mobile telephone is illustrated. The electronic device 50 includes a control circuit 52 that is responsible for overall operation of the electronic device 50, including controlling proximity and tremor detection, ringing and vibration for incoming calls, and wake and sleep functions for the phone. The control circuit 52 includes a processor 54 that executes an operating system 56. The processor 54 may also perform mathematical functions relating to the above-described exemplary method for detecting tremors. For example, the processor 54 may perform signal detrending, may apply an FFT to the signal, may calculate the mean magnitude of frequency ranges of the signal, and may compare the calculated mean magnitudes. Typically, control over proximity and tremor detection, ringing and vibration for incoming calls, and wake and sleep functions are embodied as part of the operating system 56. In other embodiments, one or more of these functionalities may be embodied in on or more dedicated applications.

The electric device 50 may further include a sample buffer 58 and a sample counter 60 for implementing the tremor-detection functions. The sample buffer 58 may be stored on a memory 62, or may be stored in a dedicated memory of the control circuit 52. The sample buffer 58 may be of any suitable size so as to accommodate the samples to be stored as described in the above exemplary method for detecting tremors. For example, the sample buffer may be sized to accommodate 128 samples of a vibration signal at 200 Hz. The sample buffer 58 may further be treated as a queue so that when new samples are to be added to the buffer, the existing samples are shifted toward the end of the buffer, dropping the oldest samples, and making room for the newest samples.

Likewise, the sample counter 60 may be stored on a memory 62, or may be stored in a dedicated memory of the control circuit 52. The sample counter 60 should be large enough to hold as many indicators as would be created during the predetermined time period during which a threshold number of detections will trigger an output that human tremors are sensed. The indicators may be stored in any form such as binary bits, integers, and so forth. The sample counter may also be treated as a queue, so that when a new indicator is to be added to the queue, the existing indicators are shifted toward the end of the queue, dropping the oldest indicator, and making room for the newest indicator. For example, if the system is configured so that 10 detections out of 15 sets of samples will trigger an output that tremors are sensed, then the sample counter could be a 15-bit queue. For each analyzed sample set, a new bit indicating detection (e.g. 1 for detection, 0 for no detection) is added to the queue. The processor 52 may then parse the queue to see if it contains 10 or more bits representing detection and, if so, output that the electronic device has sensed human tremors.

It should be appreciated that there are many different techniques of counting detections. For example, a certain number of consecutive sample detections may trigger an output that the electronic device has sensed human tremors. In this case, the sample counter 60 may simply be an integer the counts up with each sample set that results in a detection and resets to zero whenever a sample set does not result in a detection. Once the sample counter 60 reaches or exceeds the threshold number of sample set detections to trigger an output that the electronic device has sensed human tremors, then the processor 52 may create that output.

The operating system 56, applications 64, and stored data 66 (e.g., data associated with the operating system 56, the applications 64, and user files), may also be stored on a memory 62. The operating system 56 and applications 64 are embodied in the form of executable logic routines (e.g., lines of code, software programs, etc.) that are stored on a non-transitory computer readable medium (e.g., the memory 62) of the electronic device 50 and are executed by the control circuit 52. The described tremor and proximity detection operations may be thought of as a method that is carried out by the electronic device 50.

The processor 54 of the control circuit 52 may be a central processing unit (CPU), microcontroller, or microprocessor. The processor 54 executes code stored in a memory (not shown) within the control circuit 52 and/or in a separate memory, such as the memory 62, in order to carry out operation of the electronic device 50. The memory 62 may be, for example, one or more of a buffer, a flash memory, a hard drive, a removable media, a volatile memory, a non-volatile memory, a random access memory (RAM), or other suitable device. In a typical arrangement, the memory 62 includes a non-volatile memory for long-term data storage and a volatile memory that functions as system memory for the control circuit 52. The memory 62 may exchange data with the control circuit 52 over a data bus. Accompanying control lines and an address bus between the memory 62 and the control circuit 52 also may be present. The memory 62 is considered a non-transitory computer readable medium.

The electronic device 50 includes communications circuitry that enables the electronic device 50 to establish various wireless communication connections. In the exemplary embodiment, the communications circuitry includes a radio circuit 64. The radio circuit 68 includes one or more radio frequency transceivers and an antenna assembly (or assemblies). In the case that the electronic device 50 is a multi-mode device capable of communicating using more than one standard and/or over more than one radio frequency band, the radio circuit 68 represents one or more than one radio transceiver, one or more than one antenna, tuners, impedance matching circuits, and any other components needed for the various supported frequency bands and radio access technologies. The radio circuit 68 further represents any radio transceivers and antennas used for local wireless communications directly with another electronic device, such as over a Bluetooth interface.

The electronic device 50 further includes the display 70 for displaying information to a user. The display 70 may be coupled to the control circuit 52 by a video circuit 72 that converts video data to a video signal used to drive the display 70. The video circuit 72 may include any appropriate buffers, decoders, video data processors and so forth.

The electronic device 50 may include one or more user inputs 74 for receiving user input for controlling operation of the electronic device 50. Exemplary user inputs include, but are not limited to, the touch sensitive input 76 that overlays or is part of the display 70 for touch screen functionality, one or more buttons 78, and so forth. Motion sensors 80 may also be considered part of the user inputs 74. Motion sensors 80 may include one or accelerometers 82 used, among other things, to sense vibration of the electronic device, such as vibration from natural human tremors. The motion sensors 80 may further include other motion sensing devices such as gyro sensors and associated circuitry.

The electronic device 50 may further include a sound circuit 84 for processing audio signals, such as phone ring. Coupled to the sound circuit 84 are a speaker 86 and a microphone 88 that enable audio operations that are carried out with the electronic device 50 (e.g., conduct telephone calls, output sound, capture audio for videos, etc.). The sound circuit 84 may include any appropriate buffers, encoders, decoders, amplifiers and so forth.

The electronic device 50 may include a vibration motor 89. The vibration motor 89 may include an off-balanced weight that causes the electronic device to vibrate when the motor spins. The vibration motor 89 may be coupled to the processor control circuit 52, which activates the vibration motor 89 during an incoming call. The control circuit 52 may cause the vibration motor 89 to alternate on and off so as to create a vibration pattern.

The electronic device 50 may also include on or more proximity sensors 90. The proximity sensors 90 may be coupled to the control circuit 52. The proximity sensors 90 may be physically located in any suitable place on the electronic device. In a typical arrangement, a proximity sensor is combined with or is a part of a camera, such as camera 92. If more than one proximity sensor is used, the sensors may be located on different surfaces or areas of the device, so as to lower the probability that both sensors would be covered if the device were not in an enclosed space. For example, one sensor may be placed at a top edge of a front face, while another may be placed at a bottom edge of a back face.

The proximity sensors 90 may use any number of proximity sensing techniques, such as emitting infrared light and detecting the amount of infrared light reflected back to the sensor. Other proximity sensing techniques involve emitting and detecting acoustic sound waves, or using capacitive or inductive switches to detect nearby changes in electrical or magnetic fields. In addition to performing proximity-sensing functions described herein, the proximity sensor 90 may be used to control other aspects of the electronic device 50, such as turning the display 70 on or off depending on the proximity of the electronic device 50 to a face during a call.

The electronic device 50 may further include one or more input/output (I/O) interface(s) 94. The I/O interface(s) 94 may be in the form of typical electronic device I/O interfaces and may include one or more electrical connectors for operatively connecting the electronic device 50 to another device (e.g., a computer) or an accessory (e.g., a personal handsfree (PHF) device) via a cable. Further, operating power may be received over the I/O interface(s) 94 and power to charge a battery of a power supply unit (PSU) 96 within the electronic device 50 may be received over the I/O interface(s) 94. The PSU 96 may supply power to operate the electronic device 50 in the absence of an external power source.

The electronic device 50 also may include various other components. As an example, one or more cameras 92 may be present for taking photographs or video, or for use in video telephony. As another example, a position data receiver 98, such as a global positioning system (GPS) receiver, may be present to assist in determining the location of the electronic device 50. The electronic device 50 also may include a subscriber identity module (SIM) card slot 100 in which a SIM card 102 is received. The slot 100 includes any appropriate connectors and interface hardware to establish an operative connection between the electronic device 50 and the SIM card 102.

Figure 4:
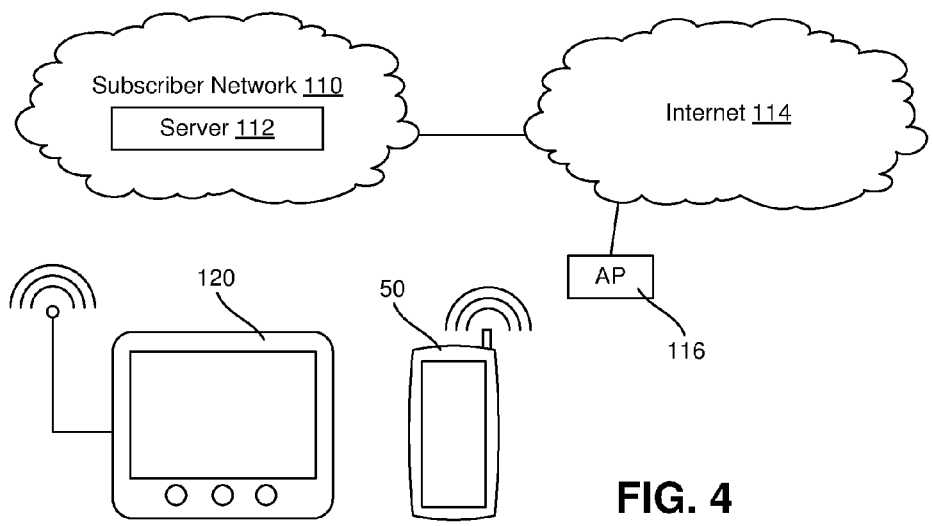
FIG. 4 is a schematic view of a communication environment for the electronic device.

Referring to FIG. 4, schematically shown is a communications environment for the electronic device 50. In the communications environment, the electronic device 50 may carry out wireless communications. To conduct wireless communications, the electronic device 50 establishes network connectivity with one or more networks. Typically, the connection is made to a subscriber network 110 that services the physical geo-location of the electronic device 50. The network 110 may provide Internet access to the electronic device 50. In most cases, the network 110 is a cellular network operated by a respective cellular service telephone company. Exemplary network access technologies for the network 110 are typically cellular circuit-switched network technologies and include, but are not limited to, global system for mobile communications (GSM), code division multiple access (CDMA), wideband CDMA (WCDMA), and advanced or alternative versions of these standards. The networks may support general packet radio service (GPRS), universal mobile telecommunications system (UMTS), 3G, 4G long-term evolution (LTE), or other standards.

The network 110 supports communications such as, but not limited to, voice communications (e.g., telephone calls), video communications (e.g., video telephony), messaging (e.g., instant messaging, text and multimedia messaging, and electronic mail messaging), data transfers, and Internet browsing. To support the communications activity of the electronic device 50, the network 110 may include a server 112 (or servers). The server 112 may be configured as a typical computer system used to carry out server functions and may include a processor configured to execute software containing logical instructions that embody the functions of the server 112 and a memory to store such software and related data.

The communications between the electronic device 50 and the subscriber network 110 may be established by way of a transmission medium (not specifically illustrated) of the subscriber network 110. The transmission medium may be any appropriate device or assembly, but is typically an arrangement of communications base stations (e.g., cellular service towers, also referred to as "cell" towers).

In some situations, the electronic device 50 may communicate with the Internet 114 via an access point 116 of a local area network (LAN) using a packet-switched protocol, such as IEEE 802.11a, IEEE 802.11b, IEEE 802.11g or IEEE 802.11n (commonly referred to as WiFi). Other LAN-based protocols are possible, such as WiMax under IEEE 802.16. The access point 116 is typically, but not necessarily, a wireless router.

The communications environment may further include any number of additional electronic devices, such as additional electronic device 120. Although additional electronic device 120 is depicted as a television, it could be any other networkable device including a speaker, a receiver for a system of speakers, a computer system or any component thereof, or another portable electronic device. The additional electronic device 120 may be connected to the electronic device through a direct wireless communications link such as Bluetooth, WiFi, RFID, NFC, and optical (e.g., infrared). The additional electronic device 120 may also be indirectly connected to the electronic device through the access point 116 or though Internet 114. In one embodiment, the additional electronic device 120 may be a wireless headset connected via Bluetooth to the electronic device 50 to receive audio output from the electronic device 50.

Although certain embodiments have been shown and described, it is understood that equivalents and modifications falling within the scope of the appended claims will occur to others who are skilled in the art upon the reading and understanding of this specification.

What is claimed is:

1. A method for controlling an electronic device including an accelerometer, a proximity sensor, and circuitry, the method comprising:
    detecting with the proximity sensor whether the electronic device is physically enclosed in a small space;
    detecting whether the electronic device is vibrating at a rate indicative of natural tremors of a human body comprising:
        receiving with the circuitry an electronic signal from the accelerometer indicative of movement of the electronic device;
        for each set of samples of a plurality of sets of samples of the signal,
            determining with the circuitry a value of a magnitude of the set of samples for a first range of frequencies indicative of natural tremors of a human body;
            determining with the circuitry a value of a magnitude of the set of samples for a second range of frequencies higher than the first range; and
            producing an output with the circuitry indicating detection when the difference between the value of the magnitude of the first range of frequencies and the value of the magnitude of second range of frequencies is greater than a threshold value; and
        producing an output with the circuitry indicating that the electronic device is vibrating at a rate indicative of natural tremors of a human body when a threshold number of sets of samples within a predetermined time period produce an output indicating detection; and
    operating with the circuitry the electronic device in response to whether the electronic device is vibrating at a rate indicative of natural tremors of a human body while the electronic device is not physically enclosed in a small space.

2. The method of claim 1, the method further comprising linearly detrending the signal.

3. The method of claim 1, wherein the detecting whether the electronic device is physically enclosed in a small space comprises detecting a sufficient amount of infrared light emitted from the electronic device.

4. The method of claim 1, wherein the operating the electronic device comprises controlling a ringer of the electronic device.

5. The method of claim 1, wherein the operating the electronic device comprises changing which of a plurality of speakers of the electronic device are used for sound output.

6. The method of claim 1, wherein the operating of the electronic device comprises controlling the volume of an application of the electronic device.

7. The method of claim 1, wherein the operating of the electronic device comprises transmitting a signal over a network to effect control of a second electronic device.

8. The method of claim 1, wherein the electronic device is a mobile phone.

9. An electronic device comprising:
    an accelerometer;
    a proximity sensor; and
    circuitry adapted to:
        receive an electronic signal from the accelerometer;
        for each set of samples of a plurality of sets of samples of the signal,
            determine a value of a magnitude of the set of samples for a first range of frequencies indicative of natural tremors of a human body;
            determine a value of a magnitude of the set of samples for a second range of frequencies higher than the first range; and
            produce an output indicating detection when the difference between the value of the magnitude of the first range of frequencies and the value of the magnitude of second range of frequencies is greater than a threshold value;
        produce an output indicating that the electronic device is vibrating at a rate indicative of natural tremors of a human body when a threshold number of sets of samples within a predetermined time period produce an output indicating detection; and
        operate the electronic device in response to whether the accelerometer detects vibration at a rate indicative of natural tremors of a human body while the proximity detector does not detect that the electronic device is physically enclosed in a small space.

10. The electronic device of claim 9, wherein the signal is linearly detrended.

11. The electronic device of claim 9, wherein the proximity sensor is an infrared proximity sensor.

12. The electronic device of claim 9, the device further comprising a ringer, wherein the operating of the electronic device includes controlling the ringer.

13. The electronic device of claim 9, the device further comprising a plurality of speakers, wherein the operating of the electronic device includes changing which of the speakers are used for sound output.

14. The electronic device of claim 9, wherein the operating of the electronic device includes controlling the volume of an application of the electronic device.

15. The electronic device of claim 9, the device further comprising a display, wherein the operating of the electronic device includes transmitting a signal over a network to effect control of a second electronic device connect.

16. The electronic device of claim 9, wherein the device is a mobile phone.

17. A method for controlling an electronic device including an accelerometer and circuitry, the method comprising:
   receiving with the circuitry an electronic signal from the accelerometer indicative of movement of the electronic device;
   for each set of samples of a plurality of sets of samples of the signal,
      determining with the circuitry a value of a magnitude of the signal for a first range of frequencies indicative of natural tremors of a human body;
      determining with the circuitry a value of a magnitude of the signal for a second range of frequencies higher than the first range; and
      producing an output with the circuitry indicating detection when the difference between the value of the magnitude of the first range of frequencies and the value of the magnitude of second range of frequencies is greater than a threshold value; and
   operating with the circuitry the electronic device in response to whether a threshold number of sets of samples within a predetermined time period produce an output indicating detection.

18. The method of claim 17, the method further comprising linearly detrending the signal.

* * * * *